United States Patent
Dedick et al.

(10) Patent No.: US 12,232,456 B1
(45) Date of Patent: Feb. 25, 2025

(54) APPLICATION OF STRUCTURALLY ALTERED GAS MOLECULES FOR HYDRATION OF PLANTS

(71) Applicants: H2Plus LLC, San Diego, CA (US); H2Plus Operations, LLC, San Diego, CA (US)

(72) Inventors: Gene Dedick, Grand Junction, CO (US); Jared Roberts, Grand Junction, CO (US)

(73) Assignee: H2Plus LLC, Grand Junction, CO (US)

( * ) Notice: Subject to any disclaimer, the term of this patent is extended or adjusted under 35 U.S.C. 154(b) by 0 days.

(21) Appl. No.: 18/376,787

(22) Filed: Oct. 4, 2023

(51) Int. Cl.
| | |
|---|---|
| A01G 31/00 | (2018.01) |
| A01G 22/15 | (2018.01) |
| B01J 19/08 | (2006.01) |
| C02F 1/461 | (2023.01) |
| C02F 1/48 | (2023.01) |

(52) U.S. Cl.
CPC ............ *A01G 31/00* (2013.01); *A01G 22/15* (2018.02); *B01J 19/087* (2013.01); *B01J 2219/0803* (2013.01); *B01J 2219/0877* (2013.01); *C02F 1/46104* (2013.01); *C02F 1/48* (2013.01)

(58) Field of Classification Search
CPC .. C25B 1/04; C25B 15/02; B01J 19/12; B01J 19/08; C01B 5/00; A01G 31/02; A01G 9/20; A01G 29/00; A61K 9/00; A61K 9/08; C05D 9/00
See application file for complete search history.

(56) References Cited

U.S. PATENT DOCUMENTS

| | | | |
|---|---|---|---|
| 10,626,036 B1 * | 4/2020 | Guoin | B01F 25/53 |
| 11,384,440 B1 * | 7/2022 | Roberts | C25B 1/04 |
| 11,634,823 B2 | 4/2023 | Roberts et al. | |
| 2017/0320732 A1 * | 11/2017 | Gourley | A61K 8/22 |

OTHER PUBLICATIONS

2021, Application of a Structured Water Generator for Crop Irrigation: Structured Water, Drought Tolerance, and Alteration of Plant Defense Mechanisms to Abiotic Stressors; Craig Ramsey; journal of basic and applied science (Year: 2021).*

* cited by examiner

*Primary Examiner* — Walter D. Griffin
*Assistant Examiner* — Cameron J Allen
(74) *Attorney, Agent, or Firm* — Georgiy L. Khayet (57) ABSTRACT

Methods and systems for hydration of plants are provided. An example method includes generating structurally altered gas molecules from water. The structurally altered gas molecules have a higher probability of attraction of electrons into areas adjunct to the structurally altered gas molecules than molecules of the water. The method further includes infusing the structurally altered gas molecules into water. The method further includes providing the water infused by the structurally altered gas molecules to a plant. The structurally altered gas molecules cause improvement of at least one characteristic concerning growing of the plant.

9 Claims, 12 Drawing Sheets

| Hemp flower production | | Harvested weight in lbs. |
|---|---|---|
| 25 plants | water infused with structurally altered gas molecules | 62 |
| 25 plants | RO water | 46 |

| Tomato Fruit | Tap (g) | R/O (g) | Gas (g) |
|---|---|---|---|
| 1 | 37 | 47 | 90 |
| 2 | 36 | 48 | 87 |
| 3 | 42 | 43 | 93 |
| 4 | 43 | 52 | 92 |
| 5 | 46 | 54 | 105 |
| 6 | 38 | 55 | 84 |
| 7 | 39 | 54 | 88 |
| 8 | 40 | 51 | 101 |
| 9 | 42 | 51 | 110 |
| 10 | 48 | 58 | 83 |
| 11 | 35 | 51 | 86 |
| 12 | 34 | 46 | 81 |
| 13 | 46 | 47 | 92 |
| 14 | 42 | 43 | 87 |
| 15 | 35 | 50 | 86 |
| 16 | 34 | 50 | 104 |
| 17 | 37 | 45 | 91 |
| 18 | 39 | 51 | 82 |
| 19 | 44 | 52 | 76 |
| 20 | 43 | 52 | 82 |
| total fruit weight (g) | 800 | 1000 | 1800 |
| Average fruit weight (g) | 40 | 50 | 90 |

FIG. 5

| Tomato | Germination | | Day | TOMATO HEIGHT (inches) | | | Fruit Weight Avg (grams) | | | Fruit formation | |
| Day | Municipal R/O | GdS | | Municipal R/O | Municipal R/O | GdS | Municipal R/O | | GdS | Municipal R/O | GdS |
| --- | --- | --- | --- | --- | --- | --- | --- | --- | --- | --- | --- |
| 4 | 80% | 100% | 4 | | | | | | | | |
| 7 | 90% | | 7 | | | | | | | | |
| 14 | | | 14 | | | | | | | | |
| 28 | | | 28 | 5 | 5 | 7 | | | | | |
| 35 | | | 35 | 10 | 10 | 14 | | | | | |
| 42 | | | 42 | 14 | 15 | 21 | | | | | |
| 49 | | | 49 | 18 | 19 | 28 | | | | | |
| 56 | | | 56 | 22 | 23 | 34 | | | | | |
| 63 | | | 63 | 26 | 27 | 39 | | | | | |
| 70 | | | 70 | 30 | 31 | 44 | 40 | 50 | | yes | |
| 77 | | | 77 | 34 | 35 | 47 | | | | | yes |
| 84 | | | 84 | 35 | 36 | 49 | | 50 | 80 | | yes |
| 91 | | | 91 | 36 | 37 | 51 | | | | | |

Process grow in soil less substrate under 300 watt LEDs. Maintain lights 18" above plants. Fertilize every 2 weeks with 12-6-6 till week 8 (1 gal. solution).

Cucumbers

| Day | Municipal Germination | Nodes | Leaf count | Algae formation | Root mass weight (g) |
|---|---|---|---|---|---|
| 1 | | | | | |
| 2 | | | | | |
| 3 | 100% | | | | |
| 7 | | | | | |
| 10 | | | 2 | yes | |
| 14 | | 2 | 3 | | |
| 21 | | 2 | 4 | | |
| 28 | | 3 | 5 | | |
| 35 | | 3 | 6 | | |
| | | | | | 10 grams |

| Day | R/O Germination | Nodes | Leaf count | Algae formation | Root mass weight (g) |
|---|---|---|---|---|---|
| 1 | | | | | |
| 2 | | | | | |
| 3 | 100% | | | | |
| 7 | | | | | |
| 10 | | | 2 | | |
| 14 | | 2 | 3 | | |
| 21 | | 2 | 4 | yes | |
| 28 | | 3 | 5 | | |
| 35 | | 3 | 6 | | |
| | | | | | 12 grams |

| Day | Gas Germination | Nodes | Leaf count | Algae formation | Root mass weight (g) |
|---|---|---|---|---|---|
| 1 | | | | | |
| 2 | 100% | | | | |
| 3 | | | | | |
| 7 | | 2 | 4 | | |
| 10 | | 3 | 5 | | |
| 14 | | 4 | 6 | | |
| 21 | | 4 | 7 | | |
| 28 | | 5 | 8 | | |
| 35 | | 5 | 9 | none | |
| | | | | | 18 grams |

Process grown in 1 liter container with netty pot and germinated in rockwool cube. EC of .9 and maintained throught trial. Nutrient solution 3-2-4

FIG. 7

| microgreens | broccoli mass weight (g) | Radish mass weight (g) | Lettuce mass weight (g) | Basil mass weight (g) |
|---|---|---|---|---|
| Municipal | 32 | 42 | 20 | 12 |
| R/O | 33 | 43 | 21 | 13 |
| Gas | 47 | 54 | 27 | 14 |

Process with rockwool pads soaked in water. 1 tsp of seeds of each variety on pad. All harvested on day 14. No nutrient solution added

| Date | EC | Temperature | Ph | Tank cleaning | Add 1 gal. water | Algae |
|---|---|---|---|---|---|---|
| 25-Jul | 0.2 | 72-75 F | 6.5 | | | 0% |
| 25-Aug | 0.2 | 72-25 F | 6.5 | | yes | 0% |
| 25-Sep | 0.2 | 72-25 F | 6.5 | | | 0% |
| 25-Oct | 0.2 | 72-25 F | 6.5 | | yes | formation |
| 25-Nov | 0.2 | 72-25 F | 6.5 | | | 50% coverage |
| 25-Dec | 0.2 | 72-25 F | 6.5 | clean and filter change | yes | 75% coverage |
| 25-Jan | 0.2 | 72-25 F | 6.5 | | | 0% |
| 25-Feb | 0.2 | 72-25 F | 6.5 | | yes | 0% |
| 25-Mar | 0.2 | 72-25 F | 6.5 | | | 0% |
| 25-Apr | 0.2 | 72-25 F | 6.5 | | yes | formation |
| 25-May | 0.2 | 72-25 F | 6.5 | | | 25% coverage |
| 25-Jun | 0.2 | 72-25 F | 6.5 | | yes | 40% coverage |
| 25-Jul | 0.2 | 72-25 F | | | | 40% coverage |

Process with 2 gold fish and 2 loaches and Echinodoras Bleheri as plant species.
Fish are healthy and Echinodoras started with 5 leaves and now has 31 leaves

APPLICATION OF STRUCTURALLY ALTERED GAS MOLECULES FOR HYDRATION OF PLANTS

TECHNICAL FIELD

This disclosure relates to methods and systems for hydration of plants.

BACKGROUND

As the global population grows, there is increasing pressure to produce more food sustainably. Enhanced hydration techniques can contribute to sustainable agriculture by optimizing water usage, reducing waste, and minimizing environmental impact. Developing such enhanced methods is essential for addressing water scarcity, promoting sustainable agriculture, adapting to climate change, and ensuring food security while minimizing environmental impacts and resource waste. Additionally, these methods can help optimize water use, increase crop yields, and reduce the overall ecological footprint of agriculture.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method for hydration of plants is provided. The method may include generating structurally altered gas molecules from water. The structurally altered gas molecules have a higher probability of attraction of electrons into areas adjunct to the structurally altered gas molecules than molecules of the water. The method may further include infusing the structurally altered gas molecules into water. The method may further include providing the water infused by the structurally altered gas molecules to a plant. The structurally altered gas molecules cause improvement of at least one characteristic concerning growing of the plant.

According to another embodiment of the present disclosure, a system for hydration of plants is provided. The system may include a generator for generating structurally altered gas molecules from water. The structurally altered gas molecules have a higher probability of attraction of electrons into areas adjunct to the structurally altered gas molecules than molecules of the water. The system may further include a mixing chamber for infusing the structurally altered gas molecules into water and providing the water infused by the structurally altered gas molecules to a plant. The structurally altered gas molecules cause improvement of at least one characteristic concerning growing of the plant.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

FIG. 10 shows a table illustrating weight of lettuce irrigated with water infused with structurally altered gas molecules, RO water, and municipal water.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, the embodiments of this disclosure relate to methods for hydration of plants. A method for hydration of plants has been developed that provides enhanced germination, tap root growth, fibrous root development, increased turgor pressure, shorter growth cycles and more yield per acre with competitive water and nutrient usage. The method imparts focused energy on the existing water molecules, causing neutralization of the hydrogen bonding between the water molecules, enabling their structure to be altered both in angle and length. The method results in the addition of electrons which has a profound effect on the ability of living cells to solubilize and absorb organics, nutrients, and micronutrients with no additives, chemicals, or artificial ingredients. The method alters the physical properties of the water such that in closed systems (indoor grows) oxidation reduction potential (ORP) trends toward a negative state promoting the production of adenosine triphosphate (ATP) within the cell. In one time use applications (traditional irrigation) the pH is not negatively impacted and ORP and TDS are not appreciatively altered in waters that possess dissolved ions. Treated water can then hold, possess, and deploy electrons freely. This transformative process results in plants which germinate more readily, grow faster, stay healthier and get to market faster with a greater yield per acre.

The method utilizes structurally altered gas molecules to impart focused energy on the existing water molecules. The neutralization of the hydrogen bonding between the water molecules enables their structure to be altered both in angle and length. According to the method, pre-treatment begins with purification of local water source. Equipment required is easily incorporated into existing irrigation and is easily scaled for volume required. The raw input materials for this process are high-purity, non-toxic, economical, and sustainable.

Results of agricultural studies show that for tomatoes the method provided 25% more complete germination, 22% faster production of fruit, and 125% larger fruit production. The treated water provided a collective improvement in Roma tomato production of nearly 350%. For lettuce (aquaponics), the method increased lettuce production from 1.8 lbs per flat to 4.17 lbs per flat. 56% increase. Time between harvests reduced from 12 weeks to 8 weeks. 33% less grow time. For microgreens (aquaponics), the method increased microgreens (peas) yields from 2 lbs per flat in 12 days to 3 lbs per flat in 10 days, 33% more microgreens in 16.6% less time. For *cannabis*, the method provided increase in tetrahydrocannabinolic acid (THCa) at 18.52% w/o vs 21.64% w, 16.9% increase, with total cannabinoids increase of 22.36 w/o vs 25.82 w, 15.5% increase). Terpenoids increased from 24.73 mg/gm to 36.63 mg/gm or 48.1% increase, including higher amounts of gamma-limonene, beta-myrcene, linalool, alpha-humulene, alpha- and beta pinene, alpha-terpineol, camphene, and endo-fenchyl alcohol.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

This application makes reference to U.S. patent application Ser. No. 17/487,613, filed on Sep. 28, 2021, now U.S. Pat. No. 11,384,440, and to U.S. patent application Ser. No. 17/743,632, filed on May 13, 2022, now U.S. Pat. No. 11,634,823, the subject matter of which is incorporated herein by reference in its entirety for all purposes. Processes and systems described herein may be better understood in light of the concepts found in these references.

Figure 1:
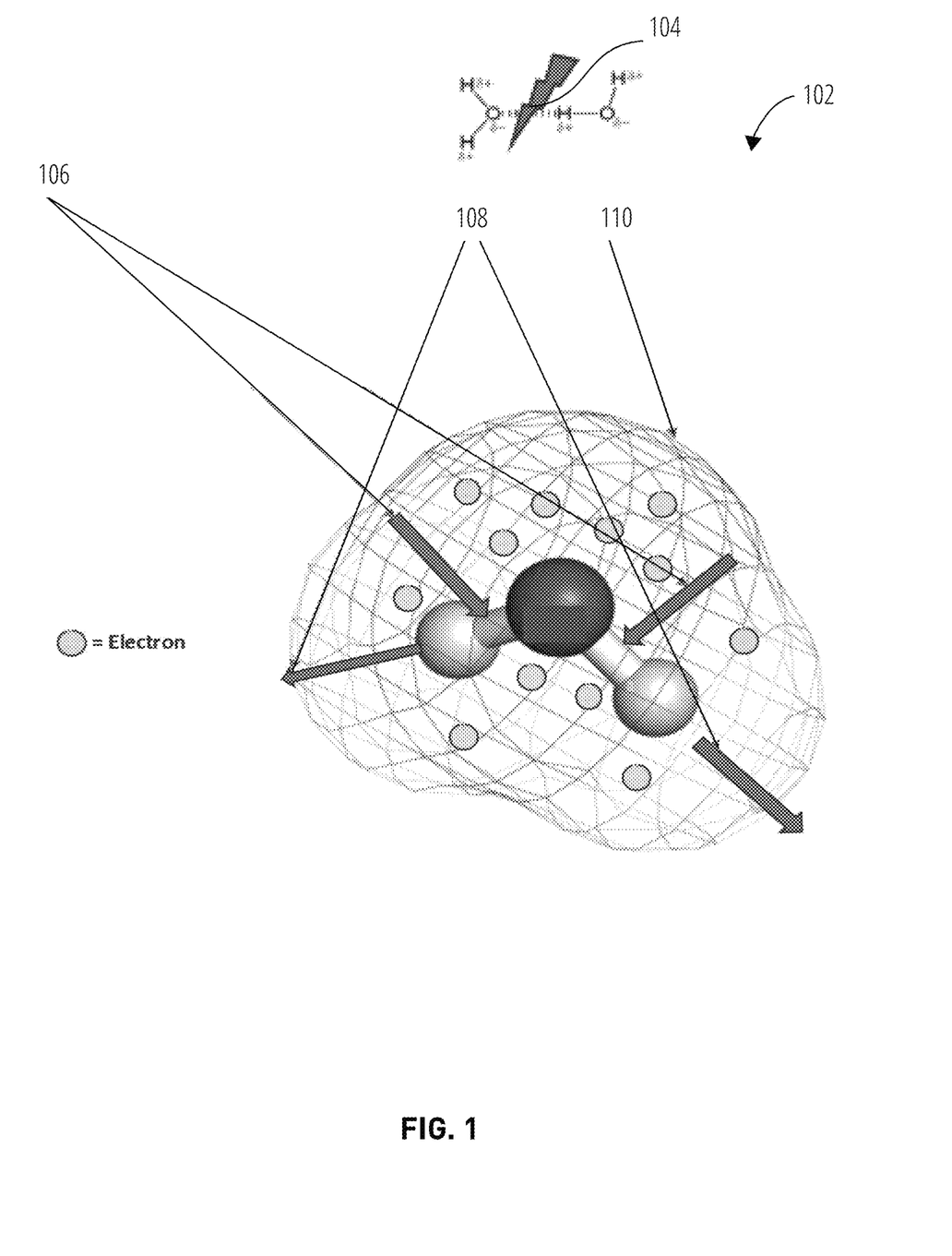
FIG. 1 shows a structurally altered gas molecule deployed in the method according to the present disclosure.

FIG. 1 shows a structurally altered gas molecule 102 deployed in the method according to the present disclosure. The structurally altered gas molecule deployed in the method of the present disclosure may include a structurally altered gas molecule generated by processes described in U.S. Pat. Nos. 11,384,440 and 11,634,823.

During the alterations, hydrogen bonds 104 are broken to allow a gaseous single molecule form of water to exist and enable the following adjustments: 1) a bond angle 106 is decreased; 2) oxygen-hydrogen covalent bond length 108 is increased; 3) adjustments allow room for more electrons in probability spheres 110. Per the molecular orbital theory (MOT), small molecules like water can adjust electron energy levels around the probability spheres. The MOT states that not just the atoms themselves but the entire molecule shares electrons.

As for the structurally altered gas molecule 102, the molecular alterations include lengthening of the H—O bonds from 0.95 Angstroms up to 1.3 Angstrom and decreasing the H—O—H bond angle from 104.5° to as small as 94°. These changes alter the chemical properties of the water that the gas may be infused into. These changes include a decrease in normal pure water pH (from 7.0 to ~6.5), and a shift in redox potential from 0 mV to ~−200 mV. This gas has been diffused into normal pure water where it has been demonstrated that the infused gas imparts some of its above-described properties to the un-gassed normal pure water.

The gas, i.e., structurally altered gas molecules, has been diffused into normal pure water where it has been demonstrated that the gas imparts its above-described properties to the un-gassed normal pure water. The restructuring of normal water molecules by diffusion of the gas into it has shown the following observed alterations in the gas diffused water allowing the accommodation of excess electrons. The first alteration is reduction in intermolecular hydrogen bonding between water molecules in liquid phase. Hydrogen bonding in water is a dynamic attraction between positively charged hydrogen atoms of one water molecule and negatively charged oxygen atoms of another water molecule. This occurs because of the difference in electronegativity between hydrogen and oxygen atoms.

The second alteration is reduction in the dipole moment of the gas treated water. The dipole moment is a measure of the separation of positive and negative electrical charges within a system. Water has a dipole moment because water has a bent structure and the electronegativity difference between atoms of oxygen and hydrogen.

The third alteration is reduction in the ion-dipole force formed between ions and water. The ion-dipole force is a force of attraction between an ion and a neutral molecule that has a dipole.

The fourth alteration is formation of hydrated electrons from the surplus excess electrons provided by the infusion of the structurally altered gas molecules. Hydrated electrons form when an excess of electrons is injected into liquid water.

These alterations reduce the tendency of the water molecules to "clump" through hydrogen bonding, and its dipole moment. The alterations also provide a reduction in the ion-dipole force formed between ions and water to facilitate a surplus availability of electrons.

Figure 2:
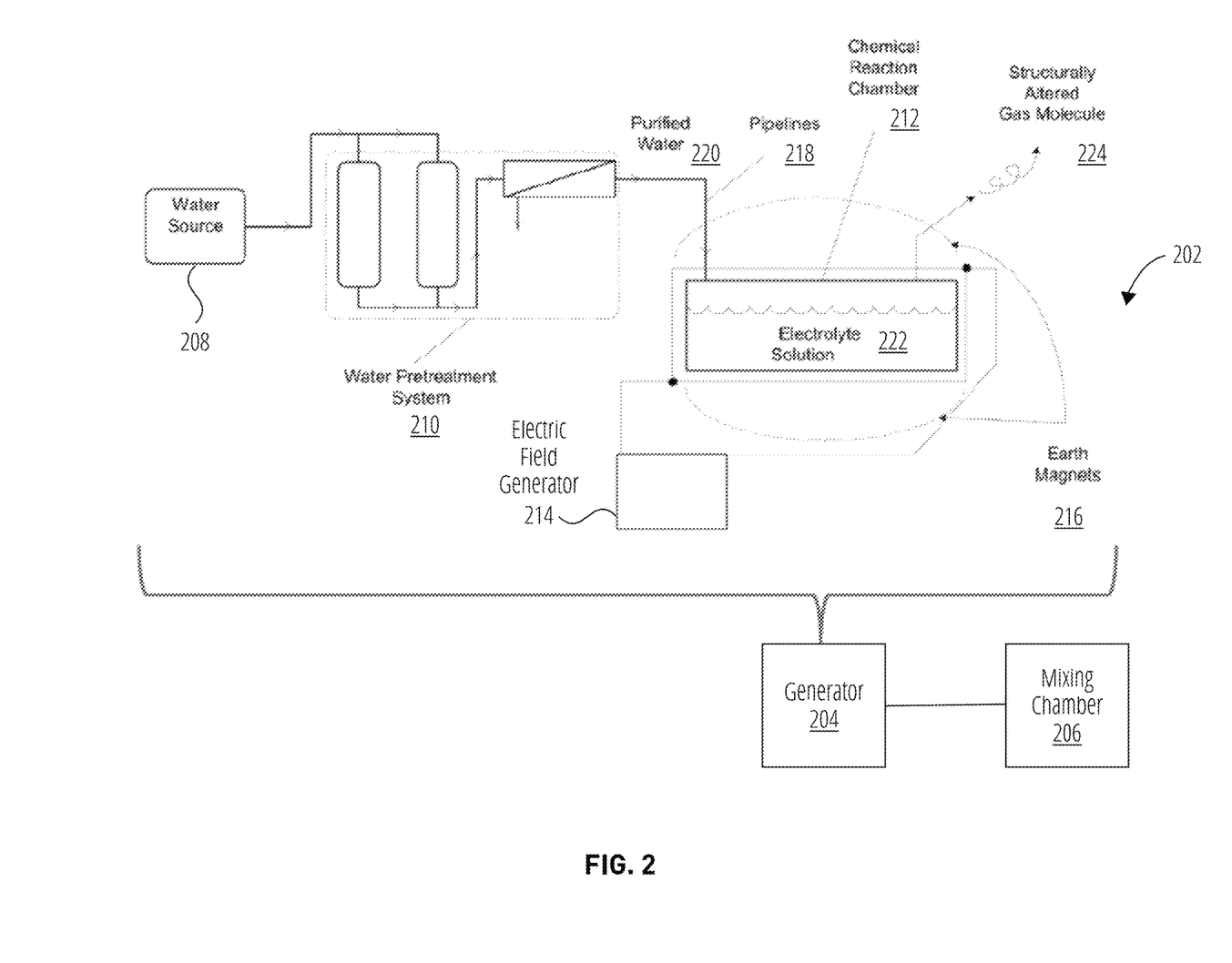
FIG. 2 is a diagram showing a system 202 for hydration of plants using structurally altered gas molecules, according to an example embodiment.

FIG. 2 is a diagram showing a system 202 for hydration of plants using structurally altered gas molecules, according to an example embodiment. The system 202 may include a generator 204 and a mixing chamber 206.

The generator 204 may include a magnetic field generator and an electric field generator 214. In an example embodiment, the magnetic field generator may include one of the following: earth magnets 216, solenoids, electromagnets, and so forth. The magnetic field generator and the electric field generator 214 may be designed to apply the magnetic field and the electric field to the combination of the purified water and the compound mixture to cause generation of the structurally altered gas molecules. The structurally altered gas molecules have a higher probability of attraction of electrons into areas adjunct to the structurally altered gas molecules than molecules of the purified water.

The mixing chamber 206 may be configured to infusing the structurally altered gas molecules into water and provide the water infused by the structurally altered gas molecules to a plant. The structurally altered gas molecules cause improvement of at least one characteristic concerning growing of the plant.

The generator 204 is an example system for generating a structurally altered gas molecule, according to an example embodiment. The generator 204 may include a water source 208, a water pretreatment system 210, a chemical reaction chamber 212, the electric field generator 214, a magnetic field generator, e.g., the earth magnets 216, and pipelines 218. The generator 204 may also include pressure regulators. The electric field generator 214 may include an electrical inverter and solar panels.

The water source 208 may provide water as a raw material for generating the gas molecule product. The water pretreatment system 210 may prepare the water for the chemical reaction chamber 212. The water pretreatment system 210 may include a filtration system, an absorption system, and a purification system to produce the purified water 220.

The chemical reaction chamber 212 may be configured to accommodate water and may contain an electrolyte solution 222. The electrolyte solution 222 can be made using a mixture of a hydroxide salt and an acid salt. The purified water 220 can be provided to the chemical reaction chamber 212. The earth magnets 216 may generate a permanent focused magnetic field. The electric field generator 214 may generate an electromagnetic field. The focused magnetic field and the electrical field may drive a chemical reaction that generates the structurally altered gas molecule 224 from the purified water supplied into the chemical reaction chamber 212. The electrolyte solution 222 may provide a medium for the focused magnetic field to align and impart energy of the focused magnetic field on the purified water mixed in with the electrolyte solution and, thereby, chemically generate the structurally altered gas molecule 224 from the purified water 220. The temperature in the chemical reaction chamber 212 can be from 60 degrees to 120 degrees Fahrenheit. The pressure in the chemical reaction chamber 212 can be from 1 atmosphere to 40 pounds per square inch gauge (psig). The structurally altered gas molecule 224 may have a higher probability of attraction of electrons into areas adjunct to the structurally altered gas molecule 224 than molecules of the water.

The structurally altered gas molecule 224 can be 99.9% hydrogen and oxygen combination in two parts of hydrogen to one part of oxygen ratio at the Standard Temperature of 68 degrees of Fahrenheit and Pressure of 1 atmosphere (STP). The structurally altered gas molecule 224 may have the O—H bond length between 0.95 and 1.3 angstroms and the H—O—H bond angle between 94 degrees and 104 degrees.

The molecular weight of the structurally altered gas molecule 224 can be between 12.14 and 12.18 atomic mass units (AMUs) at STP. In comparison, the molecular weight of pure water vapor is 18 AMUs at STP. At STP, the relative density of the structurally altered gas molecule 224 compared to dry air is 41.18%-42.00%. In comparison, relative density of pure water vapor compared to dry air is 62.19%. The structurally altered gas molecule 224 may remain stable at pressure more than 300 psig.

When dissolved in pure water having 2 parts per million (ppm) of total dissolved solids (TDS) at 25 degrees of Celsius, the structurally altered gas molecule 224 may generate an ORP of approximately −50 to −360 mV and a pH of 6.1 to 6.8 in the resulting gas-water mixture. The ORP and pH may remain stable in a closed insoluble vessel for at least 30 days. In comparison, the pure water does not possess a stable negative ORP at a pH below 7.

When dissolved in pure water (2 ppm TDS at 25 degrees Celsius), the structurally altered gas molecule 224 may reduce the concentration of TDS from 2.0 ppm to 1.0 ppm, i.e., the reduction is 50%. Barring contamination, the concentration of TDS remains stable at 1 ppm in a closed insoluble vessel indefinitely.

The changes in structure and properties of the structurally altered gas molecule 224 are caused by changes in electronic structure of the gas structurally altered structurally altered gas molecule 224 due to applying the focused magnetic field and the electrical field to the mixture of the electrolyte solution 222 and purified water 220.

In an example embodiment, a structurally altered gas molecule 224 used in the method for hydration of plants is a combination of two parts of hydrogen and one part of oxygen and produced from water. The structurally altered gas molecule 224 is produced by placing an electrolyte solution in a chemical reaction chamber, adding purified water to the chemical reaction chamber, and applying a focused magnetic field generated by a magnetic field generator and an electric field to a mixture of the purified water and the electrolyte solution to cause generation of the structurally altered gas molecule from the purified water. The temperature in the chemical reaction chamber may be from 60 degrees to 120 degrees Fahrenheit. The pressure in the chemical reaction chamber may be from 1 atmosphere to 40 psig. The structurally altered gas molecule 224 has a hydrogen-oxygen-hydrogen bond angles between 94 degrees and 104 degrees and hydrogen-oxygen bond length between 0.95 Angstrom and 1.3 Angstrom. A hydrogen bonding of the structurally altered gas molecule 224 is neutralized. The structurally altered gas molecule 224, when being dissolved in water, may have two parts per million (ppm) of TDS, causing the TDS to reduce to one ppm. When being dissolved in the purified water, the structurally altered gas molecule 224 and the water may form a solution having a pH ranging from 6.1 to 6.8.

The structurally altered gas molecule 224 may be produced with a mixture of a hydroxide salt and an acid salt as the electrolyte. The structurally altered gas molecule 224 may have a density relative to a dry air of from 41.18% to 42%. The structurally altered gas molecule 224 may be stable at a pressure exceeding 300 psig. The structurally altered gas molecule 224 may have a peak at 600 inverse centimeters in an infrared spectrum.

In an example embodiment, upon dissolving the structurally altered gas molecule 224 in water, a solution of the structurally altered gas molecule 224 and water is produced. The solution may have an oxidation/reduction potential of −50 to −360 millivolts and pH from 6.1 to 6.8. The oxidation/reduction potential and the pH may remain stable for at least 30 days after the solution is placed in a closed insoluble vessel. When infused in water, the structurally altered gas molecule 224 may cause a hydrogen bonding in the water to be neutralized.

Experiments were conducted to compare the application of the water infused with structurally altered gas molecules, municipal water, and RO water for hydration of plants. The studied plants included the following: hemp, topicals, vegetables, and aquaponics.

Figure 3:
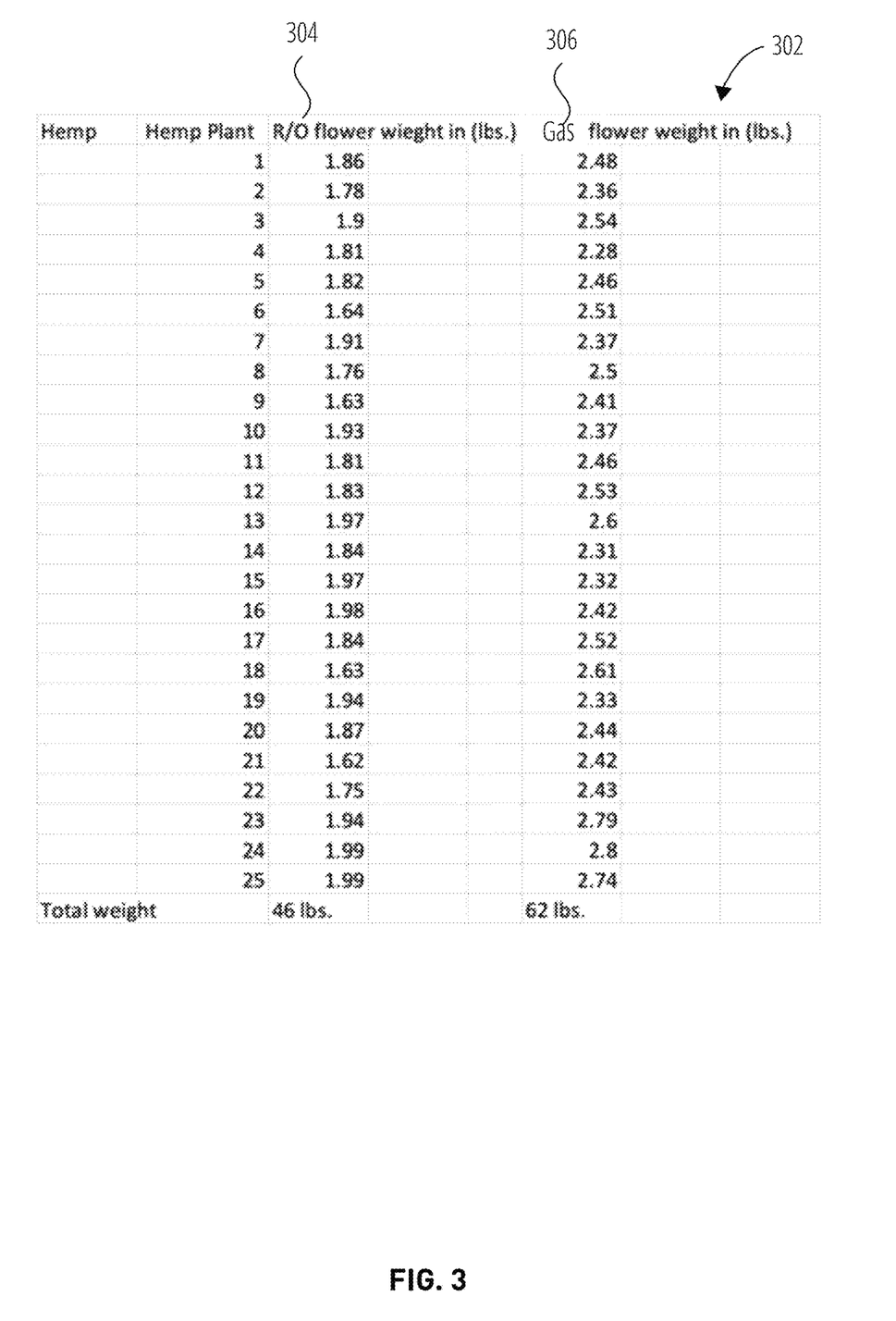
FIG. 3 shows a table illustrating weight of flowers hydrated with reverse osmosis (RO) water and weight of flowers hydrated with water infused with structurally altered gas molecules.

Hemp. 50 plants were planted and split between 2 separate rows. All were in the same growing media and equally fertilized, maintained, harvested, and cured. Only variable is the water. FIG. 3 shows a table 302 illustrating weight of flowers hydrated with RO water 304 and weight of flowers hydrated with water infused with structurally altered gas molecules shown as gas 306. Overall result was a 25% increase in total mass flower weight with the application of the water infused with structurally altered gas molecules.

Next harvest with third generation clones watered with water infused with structurally altered gas molecules and taken from second generation mothers which allowed for more nutrient uptake throughout production. This is due to the plant being fully acclimated to water infused with structurally altered gas molecules. Fertilizer uptake was able to increase 2×from week 4 in vegetative cycle through flowering cycle. An increase of 50% more mass in flower weight was detected. Hydrating with RO water resulted in average of 3 pounds per 25 square feet at normal fertilizer rates. Hydrating with water infused with structurally altered gas molecules averaged 6 lbs. per 25 square feet.

Other results were found that the harvest hydrated with water infused with structurally altered gas molecules had less trim weight by 15%.

Overall smell after curing was stronger and the flavor was enhanced when smoked/inhaled. The root development was more abundant with hydrating with water infused with structurally altered gas molecules.

Seed production was 13,000 with water infused with structurally altered gas molecules and 13,000 with RO water. 98% germination was achieved with water infused with structurally altered gas molecules. 80% germination was achieved with RO water alone.

Figure 4:
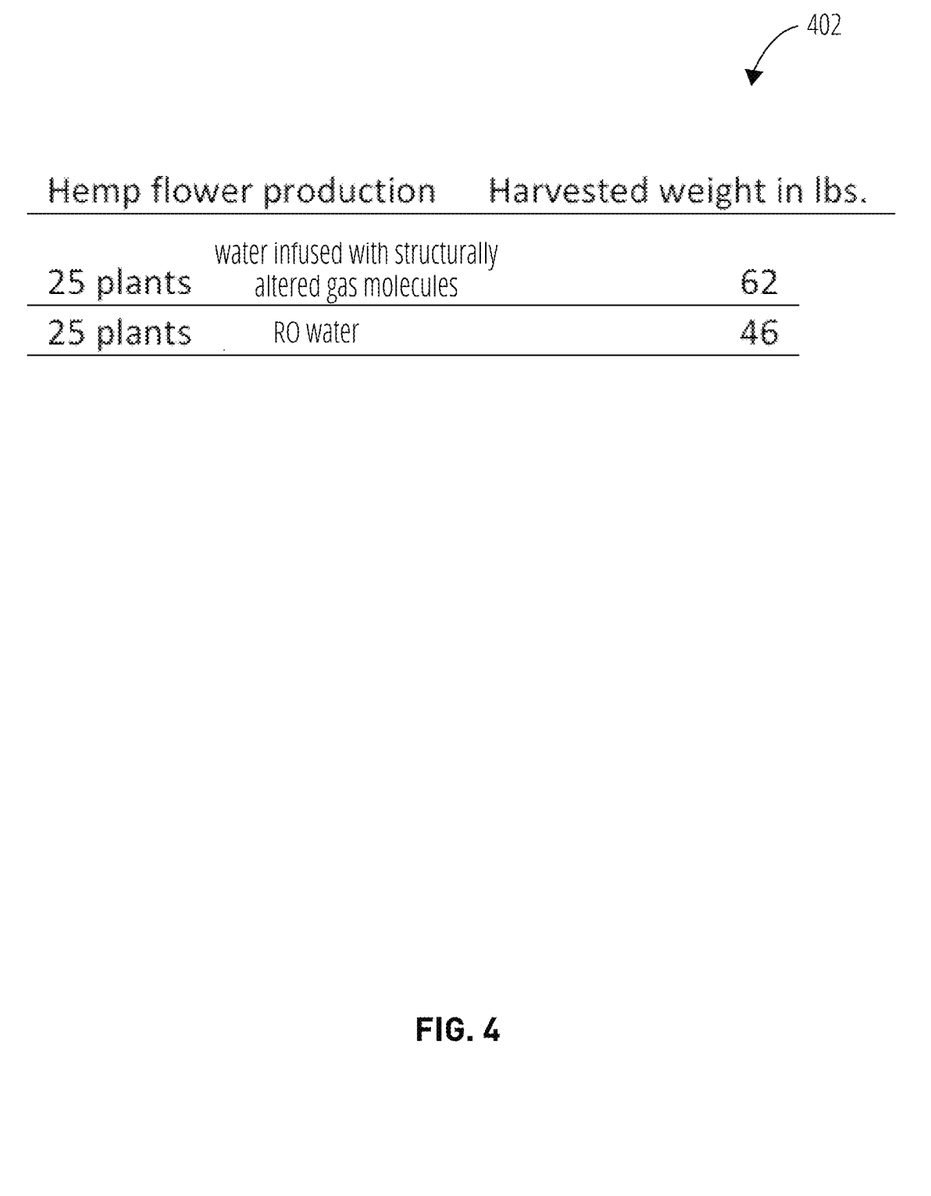
FIG. 4 is a table illustrating hemp flower production and harvested weight for plants hydrated by water infused with structurally altered gas molecules and plants hydrated by RO water.

FIG. 4 is a table 402 illustrating hemp flower production and harvested weight for plants hydrated by water infused with structurally altered gas molecules and plants hydrated by RO water. The process grown in soilless media. Identical treatments with maintenance and nutrient application through entire process were performed. The experiment included 5 plants per 25 square feet under 600-watt High Pressure Sodium (HPS) lamps in greenhouse. The duration of the experiment was a 60-day harvest.

Tropicals. Philodendron leaf placed in water infused with structurally altered gas molecules, RO water, and municipal water. The water infused with structurally altered gas molecules resulted in leaf rigidness and turgid leaves for 22 days. The stem submerged remained clean. The RO and municipal water lost turgor pressure after 12 days and began to wilt. The stems submerged became black. This indicates that with water infused with structurally altered gas molecules a higher turgor pressure is achievable.

Figure 5:
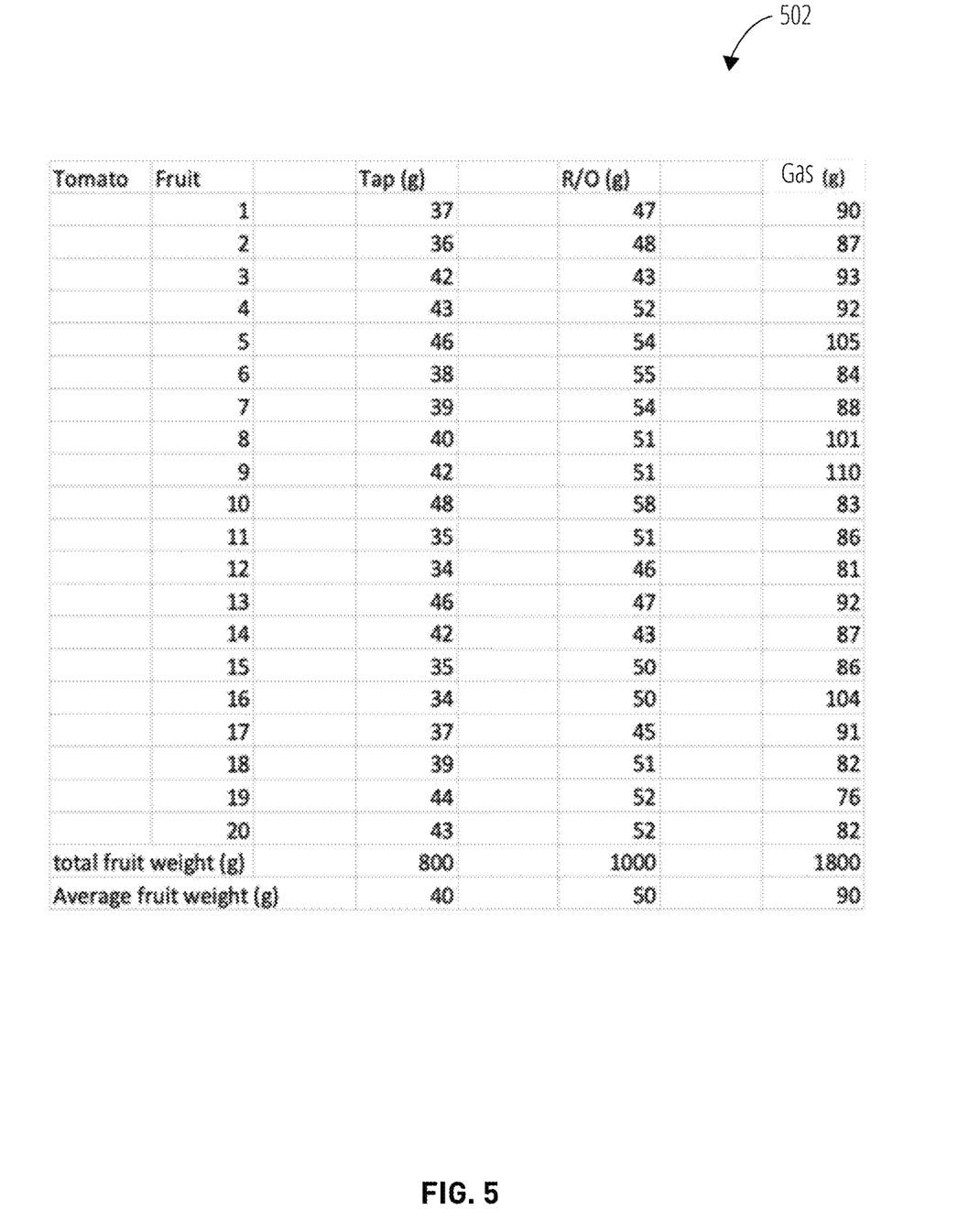
FIG. 5 shows a table illustrating weight of tomatoes irrigated with water infused with structurally altered gas molecules, RO water, and municipal water.

Tomatoes. FIG. 5 shows a table 502 illustrating weight of tomatoes irrigated with water infused with structurally altered gas molecules, RO water, and municipal water.

Figure 6:
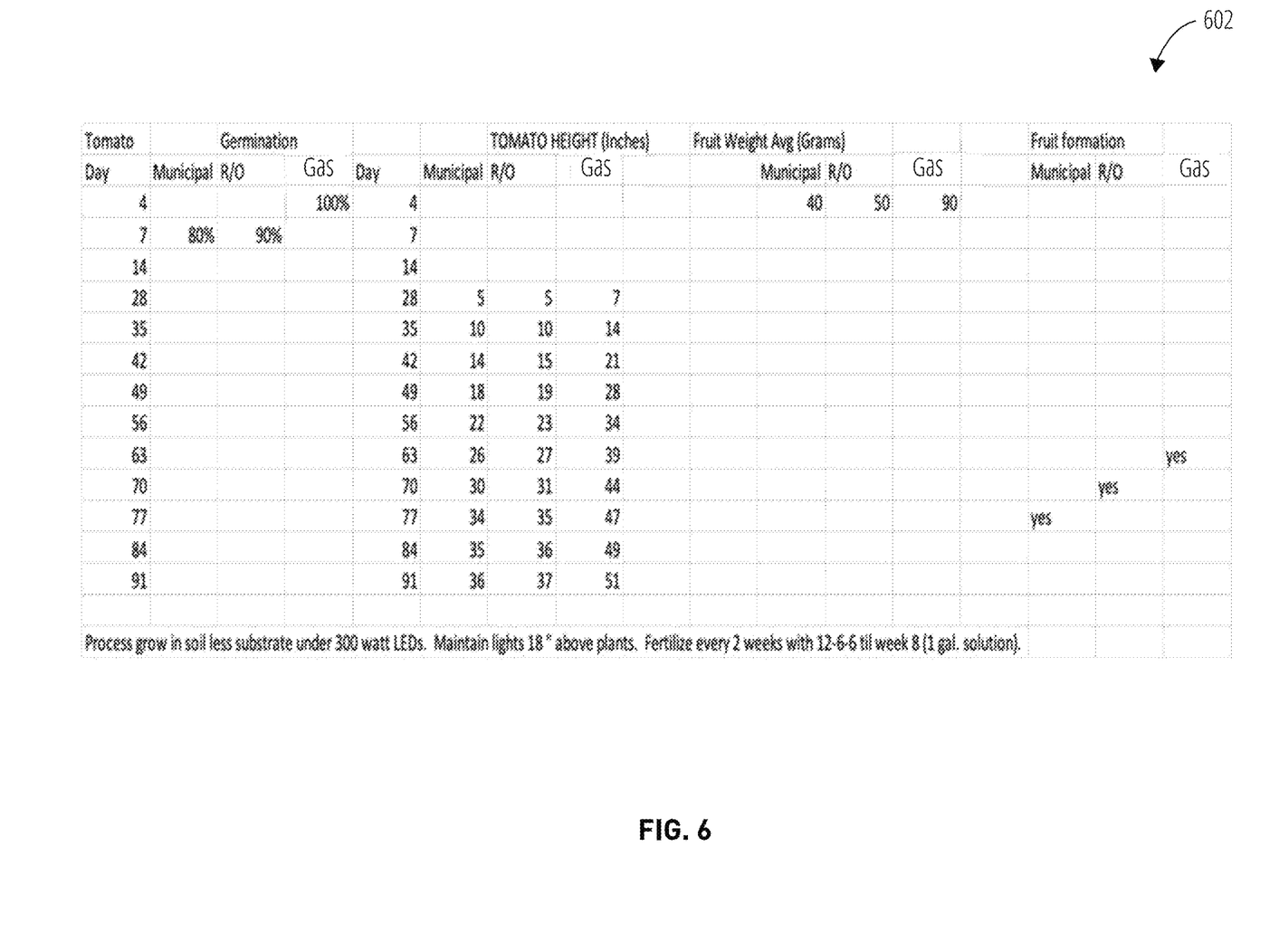
FIG. 6 shows a table illustrating height of tomatoes irrigated with water infused with structurally altered gas molecules, RO water, and municipal water.

FIG. 6 shows a table 602 illustrating height of tomatoes irrigated with water infused with structurally altered gas molecules, RO water, and municipal water.

Roma tomatoes were planted with water infused with structurally altered gas molecules, RO water, and municipal water and grown to harvest under 300-watt LEDs. Tomatoes hydrated with water infused with structurally altered gas molecules approached 2× fruit height and mass compared to RO water and municipal water. Water substrate for the tomatoes was watered with water infused with structurally altered gas molecules every other day. RO irrigation was performed every three days and municipal irrigation was performed every fourth day. This indicates a higher osmotic pressure with water infused with structurally altered gas molecules (turgor and osmotic pressure being equal).

Figure 7:
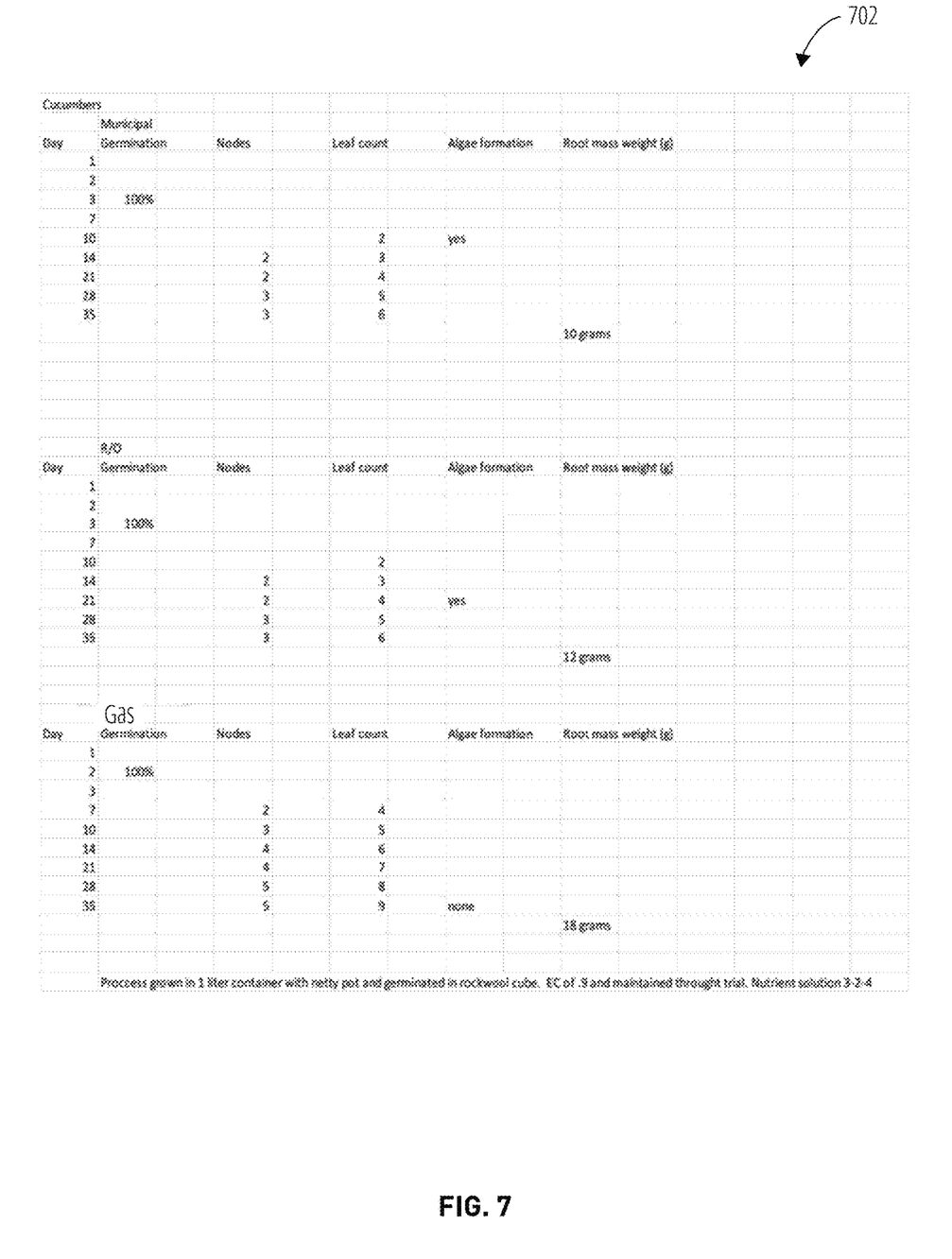
FIG. 7 shows a table illustrating leaf count of cucumbers irrigated with water infused with structurally altered gas molecules, RO water, and municipal water.

Cucumber. FIG. 7 shows a table 702 illustrating leaf count of cucumbers irrigated with water infused with structurally altered gas molecules, RO water, and municipal water. Three seedlings germinated and one of each is placed in a 0.9 EC solution with water infused with structurally altered gas molecules, RO water, and municipal water. The process is the Kratky method. 32 days grown in a clear liter container under T-8 lights. The municipal and RO water created algae, while the water infused with structurally altered gas molecules remained without. Germination occurred in 2 days with water infused with structurally altered gas molecules vs 3 days with municipal and RO water. The flower size was bigger with water infused with structurally altered gas molecules and root mass was 2×in the liter bottle. Vegetative growth was ahead by two nodes and 3 leaves in 30 days using water infused with structurally altered gas molecules.

Figure 8:
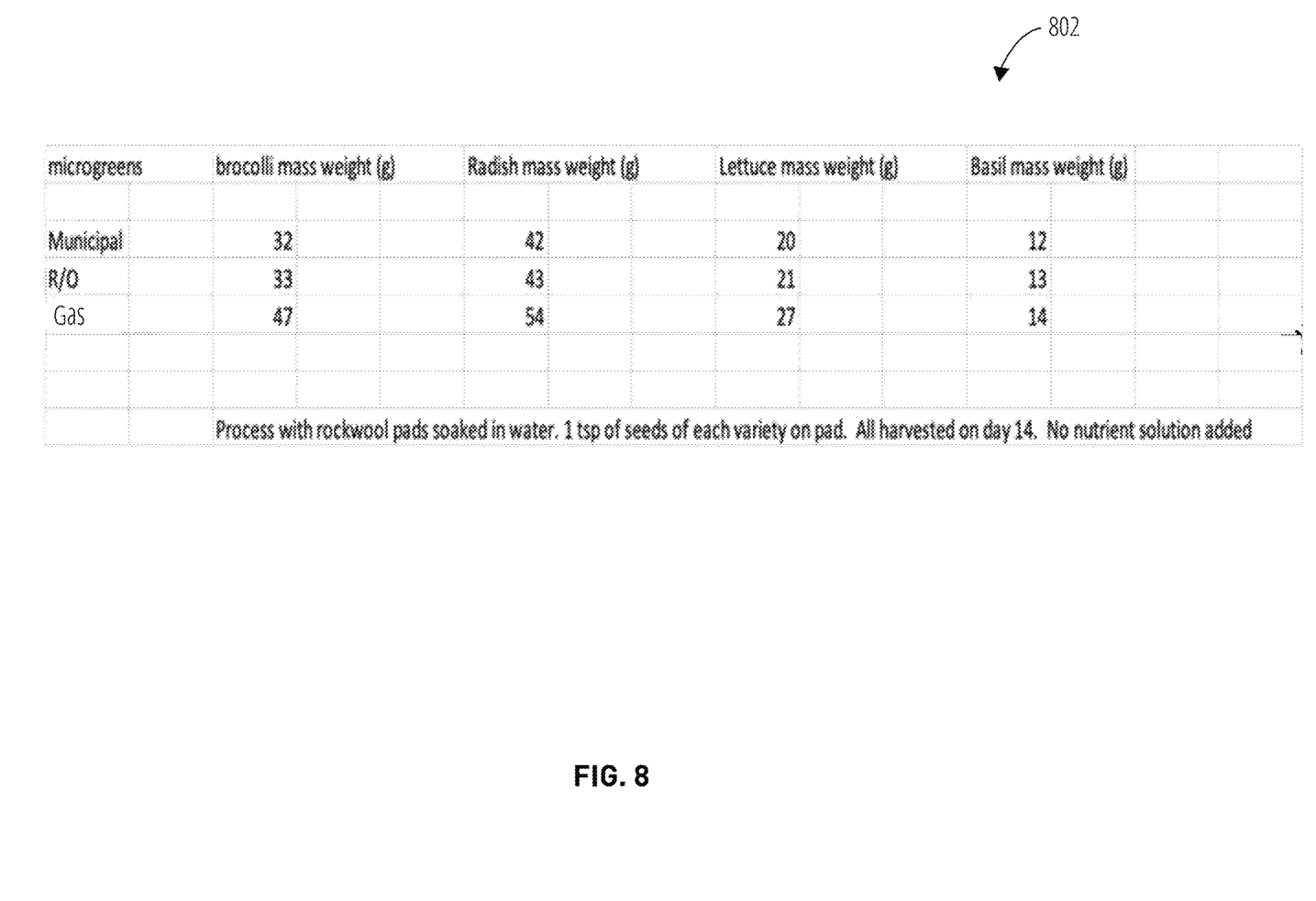
FIG. 8 shows a table illustrating weight of microgreens irrigated with water infused with structurally altered gas molecules, RO water, and municipal water.

Microgreens. FIG. 8 shows a table 802 illustrating weight of microgreens irrigated with water infused with structurally altered gas molecules, RO water, and municipal water. The experiment included production of basil, lettuce, radish, and broccoli with water infused with structurally altered gas molecules, RO water, and municipal water. All plants were grown on rockwool mats with no fertilizer incorporation. Taste from 12 sources described that the RO water-irrigated microgreens had no flavor. The municipal water-irrigated greens had a salty, bitter flavor. The greens irrigated with water infused with structurally altered gas molecules had a crunchy, more flavorful profile. Mass weight was significantly increased in all microgreen tests with water infused with structurally altered gas molecules vs municipal water RO water.

Figure 9:
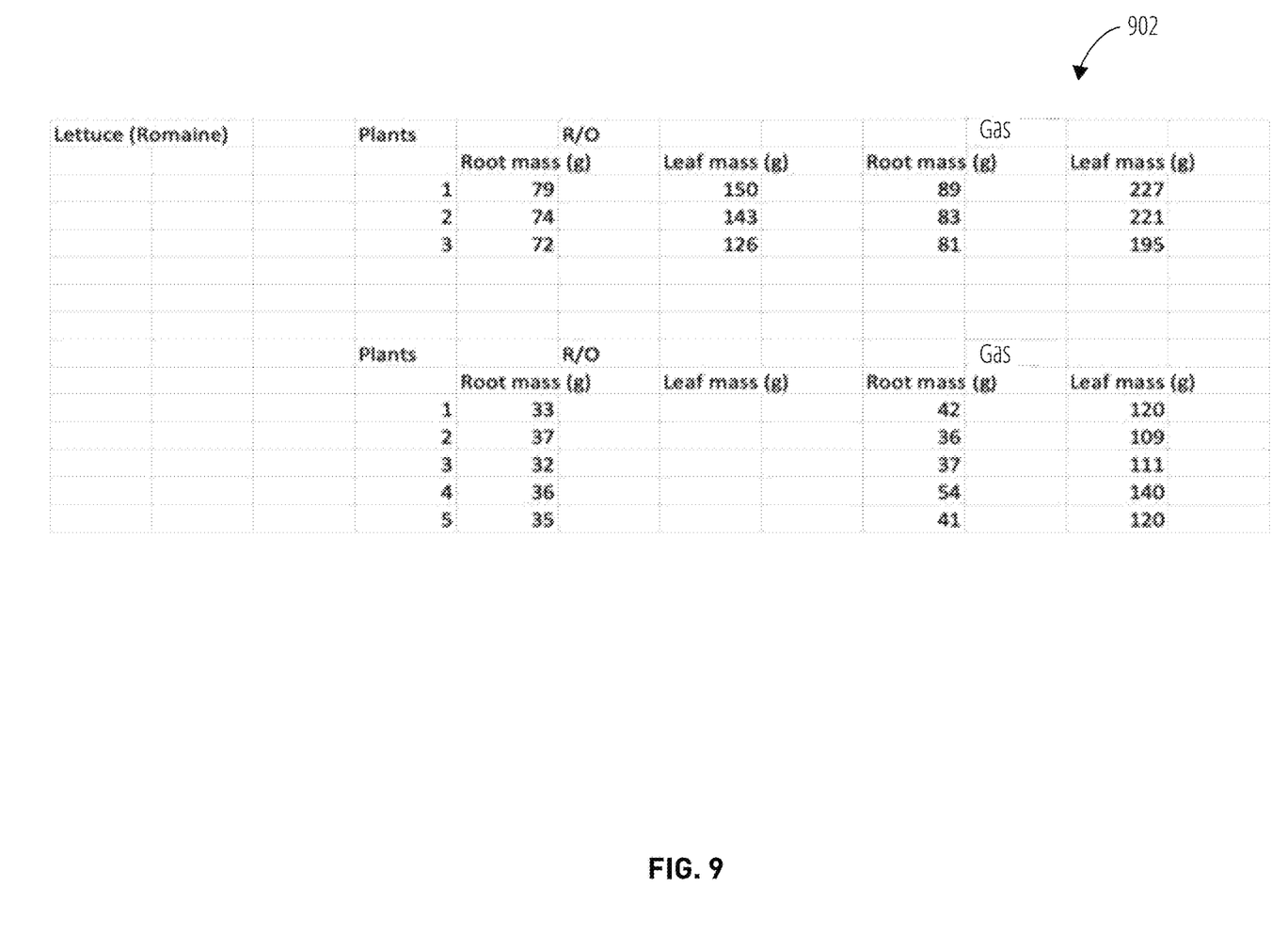
FIG. 9 shows a table illustrating weight of lettuce irrigated with water infused with structurally altered gas molecules, RO water, and municipal water.

Lettuce. FIG. 9 shows a table 902 illustrating weight of lettuce irrigated with water infused with structurally altered gas molecules, RO water, and municipal water.

FIG. 10 shows a table 1002 illustrating weight of lettuce irrigated with water infused with structurally altered gas molecules (schematically shows as "H2+"), RO water, and municipal water.

Kratky method was performed with water infused with structurally altered gas molecules and RO water in nutrient solution. 5 seedlings in a rockwool cube were placed in a ten-gallon tote with 7 gallons of nutrient solution with an EC of 0.4. Plants were grown with 300-watt LEDs. Total leaf weight of lettuce hydrated with water infused with structurally altered gas molecules is 600 grams and root mass weight of 210 grams. RO water-hydrated lettuce leaf weight is 500 grams and root mass weight of 173 grams. Taste of lettuce hydrated with water infused with structurally altered gas molecules is described as crunchy and sweet. RO water-hydrated lettuce does not have much flavor with no crunch.

Same trial was performed with increased EC to 1.3. Only 3 seedlings were used in each ten-gallon tote for this trial. Leaf weight of plants hydrated with water infused with structurally altered gas molecules was 643 grams and root weight was 251 grams. RO water leaf weight was 419 grams and root weight was 225 grams.

Figure 11:
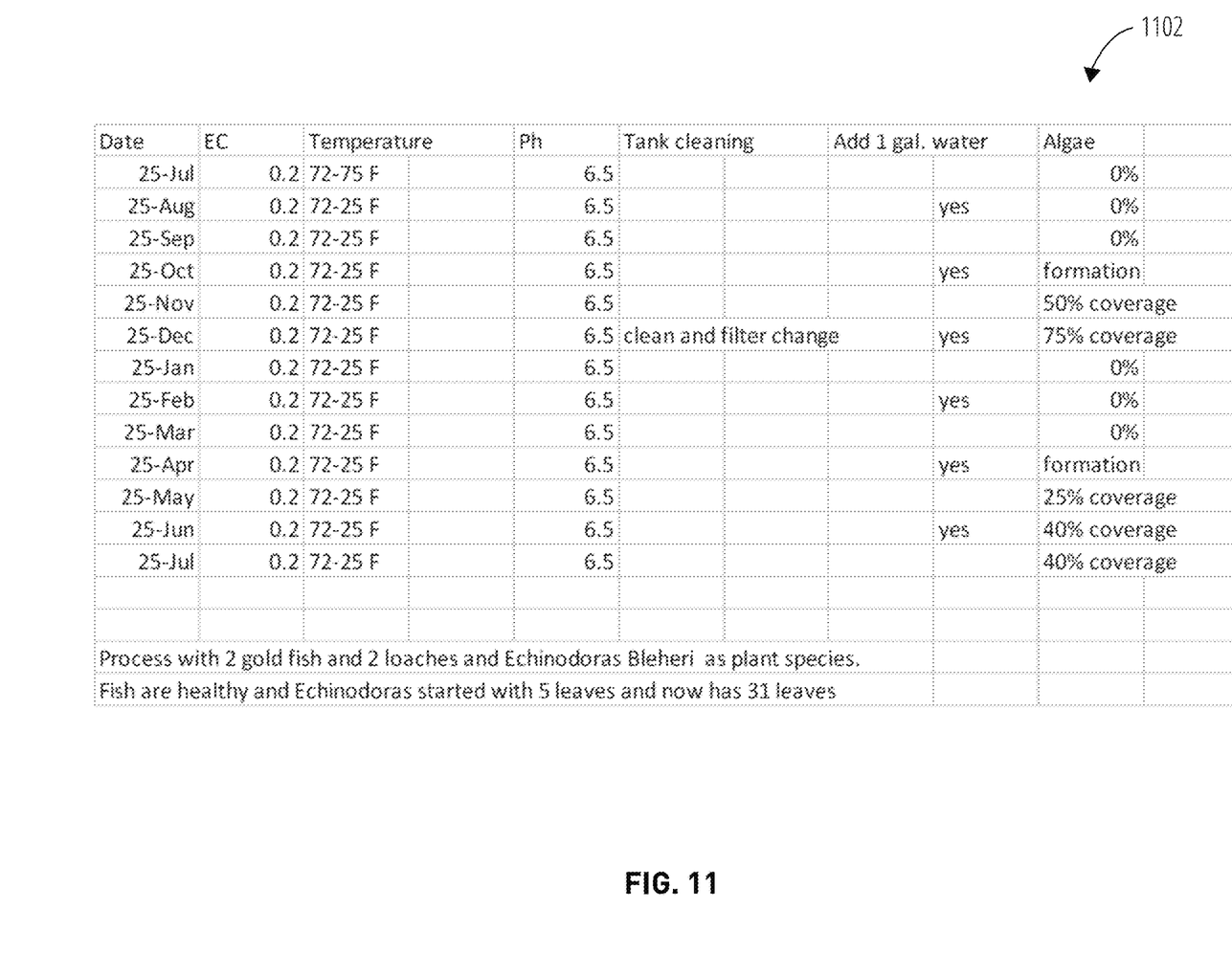
FIG. 11 illustrates applying the water infused with structurally altered gas molecules for fish and aquatic plants.

Aquaculture. FIG. 11 is a table 1102 illustrates applying the water infused with structurally altered gas molecules for Fish and aquatic plants. Fish and aquatic plants were put into a ten-gallon tank with water infused with structurally altered gas molecules. Over a year in production the plants have doubled in size. The algae growth in the tank occurred after 90 days. The tank was cleaned and the filter was replaced. There was no need to clean or replace filter again.

Observations/Conclusions. The method for hydration of plants provides enhanced germination, tap root growth, fibrous root development, increased turgor pressure, shorter growth cycles and more yield per acre with competitive water and nutrient usage. These conclusions are based on comparisons of water infused with structurally altered gas molecules against municipal (tap) water and RO water in identical environments.

Regarding aquaculture (over a year's time), the plants in this portion of the study have doubled in size. The algae growth was observed in the 10-gallon test tank after 90 days. Algae growth normally begins within 1 week in a normal aquaculture setting. 7 months later, algae were present, but the tank and filters have not required cleaning. In this experiment, pH remained stable at 6.5 throughout the test period.

Figure 12:
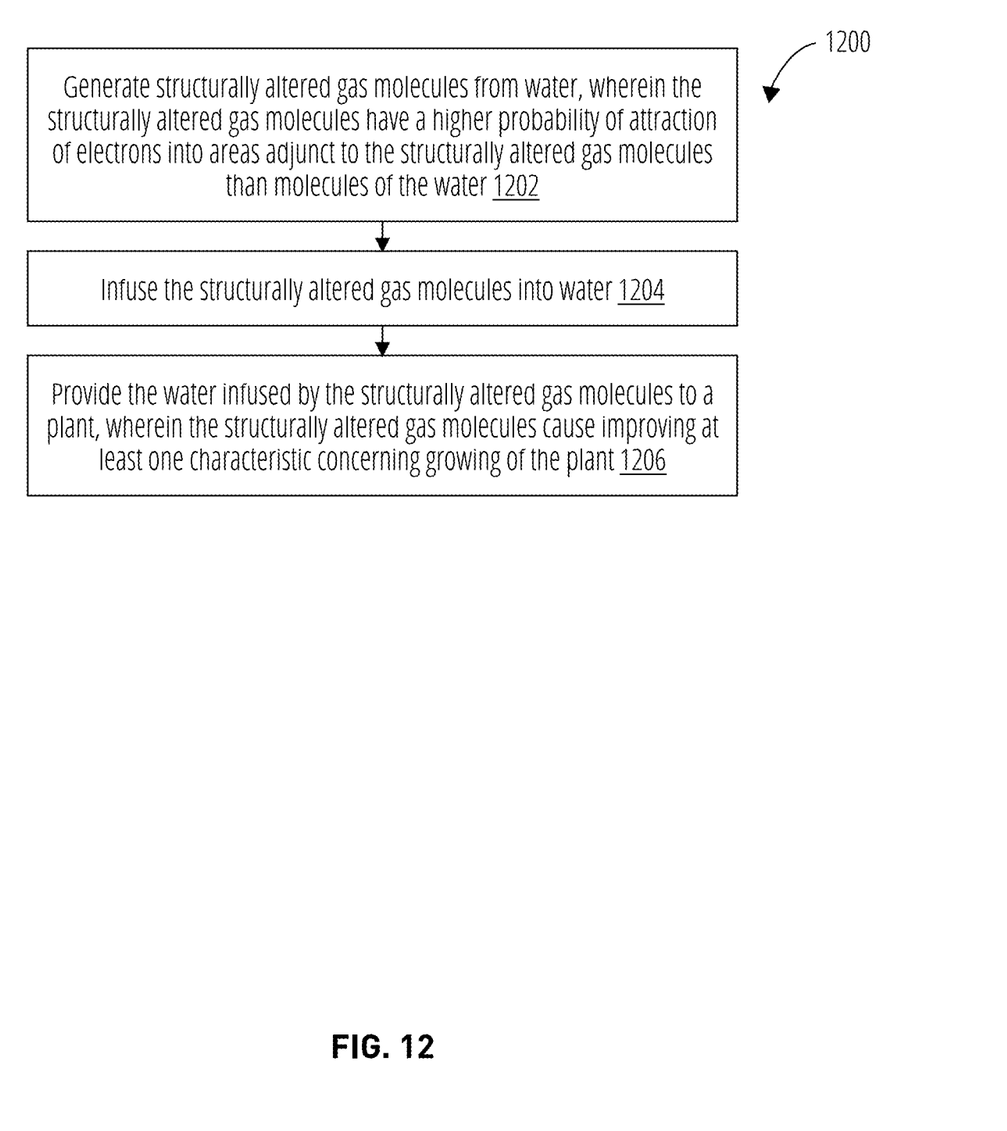
FIG. 12 is a flow chart of a method for hydration of plants, according to an example embodiment.

FIG. 12 is a flow chart of a method 1200 for hydration of plants, according to an example embodiment. In some embodiments, the operations of the method 1200 may be combined, performed in parallel, or performed in a different order. The method 1200 may also include additional or fewer operations than those illustrated.

In block 1202, the method 1200 may commence with generating structurally altered gas molecules from water. The structurally altered gas molecules have a higher probability of attraction of electrons into areas adjunct to the structurally altered gas molecules than molecules of the water. In an example embodiment, the generation of structurally altered gas molecules may include placing an electrolyte solution in a chemical reaction chamber, adding purified water to the chemical reaction chamber, and applying a focused magnetic field and an electric field to a mixture of the purified water and the electrolyte solution to cause generation of the structurally altered gas molecule from the purified water. The structurally altered gas molecule is a combination of two parts hydrogen and one part oxygen. The structurally altered gas molecule has a hydrogen-oxygen-hydrogen bond angle between 94 degrees and 104 degrees and hydrogen-oxygen bond length between 0.95 Angstrom and 1.3 Angstrom.

In block 1204, the method 1200 proceeds with infusing the structurally altered gas molecules into water. In block 1206, the method 1200 includes providing the water infused by the structurally altered gas molecules to a plant. The structurally altered gas molecules cause improvement of at least one characteristic concerning growing of the plant. In an example embodiment, upon being provided to the plant, the water infused by the structurally altered gas molecules increases an ability of living cells of the plant to solubilize and absorb organics, nutrients, and micronutrients. In some example embodiments, upon being provided to lettuce, the water infused by the structurally altered gas molecules causes an increase of production of the lettuce by 56%.

In an example embodiment, upon being provided to lettuce, the water infused by the structurally altered gas molecules causes a decrease of grow time of the lettuce by 33%. In some example embodiments, upon being provided to microgreens including peas, the water infused by the structurally altered gas molecules causes an increase of production of the microgreens by 33%.

In an example embodiment, upon being provided to microgreens including peas, the water infused by the structurally altered gas molecules causes a decrease of grow time of the microgreens by 16.6%. In some example embodiments, upon being provided to *cannabis*, the water infused by the structurally altered gas molecules causes an increase of tetrahydrocannabinol in the *cannabis* by 16.9%.

In an example embodiment, upon being provided to *cannabis*, the water infused by the structurally altered gas molecules causes an increase of total cannabinoids in the *cannabis* by 15.5%. In some example embodiments, upon being provided to *cannabis*, the water infused by the structurally altered gas molecules causes an increase of terpenoids in the *cannabis* by 48.1%.

Thus, systems and methods for hydration of plants have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for hydration of plants, the method comprising: generating structurally altered gaseous water molecules from water, wherein the structurally altered gaseous water molecules have a higher probability of attracting electrons into areas adjunct to the structurally altered gaseous water molecules than molecules of the water; infusing the structurally altered gaseous water molecules into water; and providing the water infused by the structurally altered gaseous water molecules to a plant for a first predetermined period of time, wherein the structurally altered gaseous water molecules cause improvement of at least one characteristic concerning growth of the plant, wherein upon being provided to the plant, the water infused by the structurally altered gaseous water molecules causes an increase of production of the plant by at least 33% as compared to production of the plant by watering, for a second predetermined period of time, the plant with one of tap water and reverse osmosis water, the first predetermined period of time being shorter than the second predetermined period of time.

2. The method of claim 1, wherein, upon being provided to the plant, the water infused by the structurally altered gaseous water molecules increases an ability of living cells of the plant to solubilize and absorb organics, nutrients, and micronutrients.

3. The method of claim 1, wherein, upon being provided to lettuce, the water infused by the structurally altered gaseous water molecules causes an increase of production of the lettuce by 56%.

4. The method of claim 1, wherein, upon being provided to lettuce, the water infused by the structurally altered gaseous water molecules causes a decrease of grow time of the lettuce by 33%.

5. The method of claim 1, wherein, upon being provided to microgreens including peas, the water infused by the structurally altered gaseous water molecules causes a decrease of grow time of the microgreens by 16.6%.

6. The method of claim 1, wherein, upon being provided to *cannabis*, the water infused by the structurally altered gaseous water molecules causes an increase of tetrahydrocannabinol in the *cannabis* by 16.9%.

7. The method of claim 1, wherein, upon being provided to *cannabis*, the water infused by the structurally altered gaseous water molecules causes an increase of total cannabinoids in the *cannabis* by 15.5%.

8. The method of claim 1, wherein, upon being provided to *cannabis*, the water infused by the structurally altered gaseous water molecules causes an increase of terpenoids in the *cannabis* by 48.1%.

9. The method of claim 1, wherein: the generation of the structurally altered gaseous water molecules includes: placing an electrolyte solution in a chemical reaction chamber; adding purified water to the chemical reaction chamber; and applying a focused magnetic field and an electric field to a mixture of the purified water and the electrolyte solution to cause the generation of the structurally altered gaseous water molecules from the purified water, wherein: the structurally altered gaseous water molecules are a combination of two parts hydrogen and one part oxygen; and the structurally altered gaseous water molecules have a hydrogen-oxygen-hydrogen bond angle between 94 degrees and 104 degrees and hydrogen-oxygen bond length between 0.95 Angstrom and 1.3 Angstrom.

* * * * *